Jan. 15, 1924.

L. W. CHUBB 1,480,666

BALANCED PHASE CONVERTING SYSTEM

Original Filed Dec. 13, 1917     2 Sheets-Sheet 1

WITNESSES:
J.T.Wurmb.
D.C.Davis

INVENTOR
Lewis W. Chubb.
BY
Wesley G. Carr
ATTORNEY

Jan. 15, 1924.
L. W. CHUBB
BALANCED PHASE CONVERTING SYSTEM
Original Filed Dec. 13, 1917    2 Sheets-Sheet 2
1,480,666
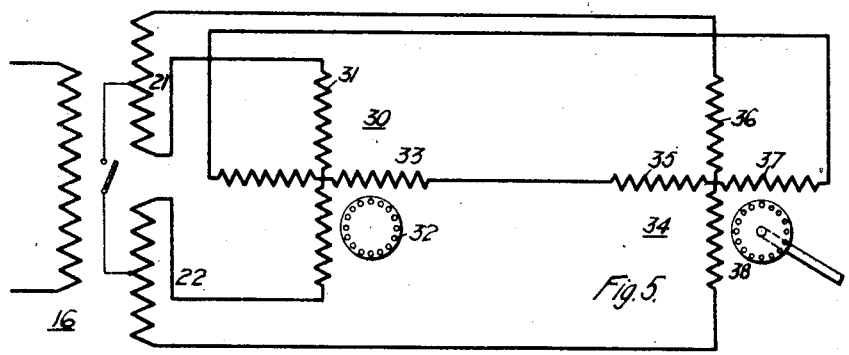
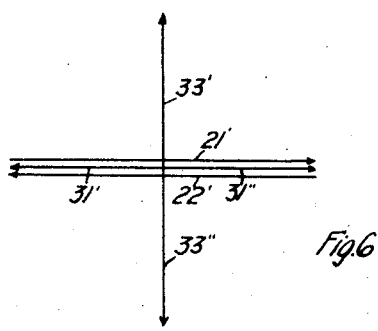
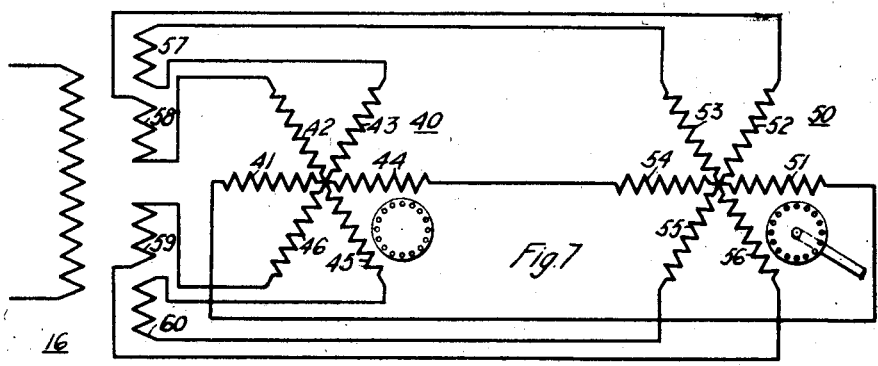
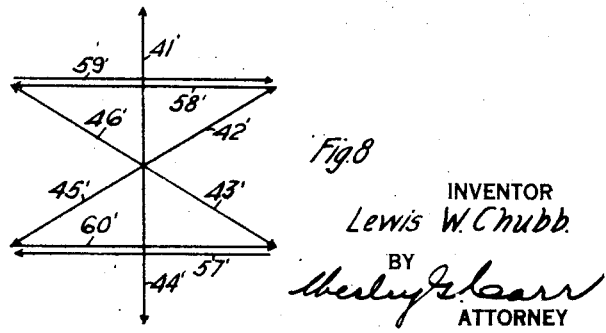
WITNESSES:
J.T. Wurmb
D.C. Davis
INVENTOR
Lewis W. Chubb.
BY
Chesley F. Carr
ATTORNEY Patented Jan. 15, 1924.

1,480,666

UNITED STATES PATENT OFFICE.

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

BALANCED PHASE-CONVERTING SYSTEM.

Application filed December 13, 1917, Serial No. 206,921. Renewed October 14, 1922. Serial No. 594,645.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Balanced Phase-Converting Systems, of which the following is a specification.

My invention relates to systems of phase conversion from single-phase to polyphase circuits or vice versa, by means of phase-converters of the dynamo-electric type, and it has for its object to provide systems of the character designated wherein the unbalancing effects of the reactive and ohmic drops within the converter may be substantially eliminated.

Figure 1:
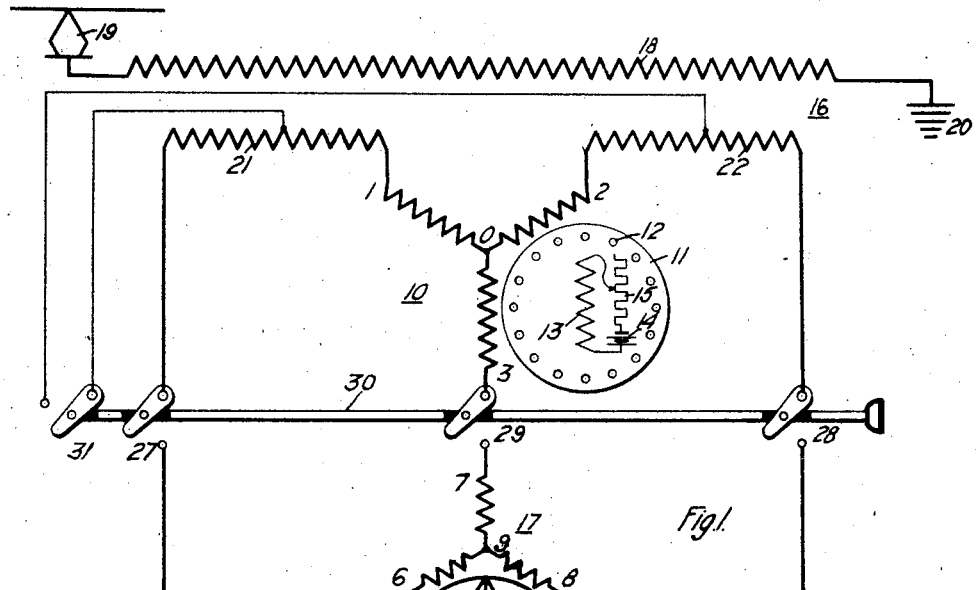
Figure 2:
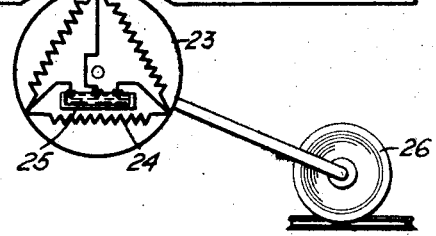
Figure 2:
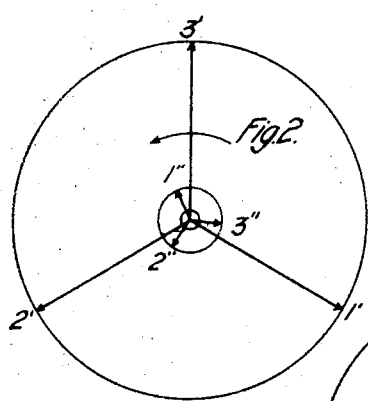
Figure 3:
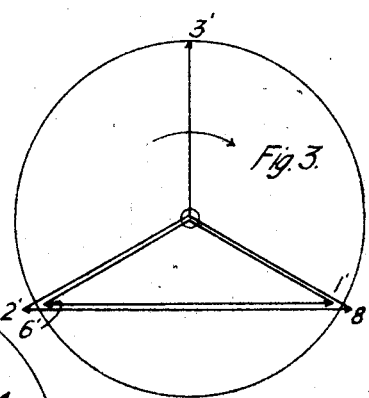
Figure 4:
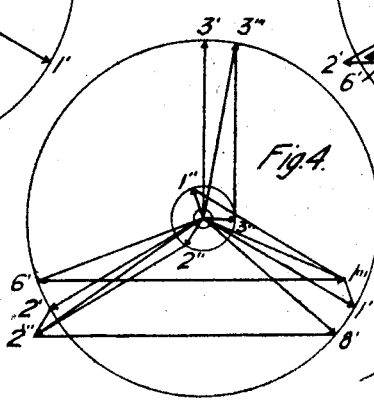

In the accompanying drawing, Fig. 1 is a diagrammatic view of a system embodying a preferred form of my invention; Figs. 2, 3 and 4 are vector diagrams illustrating the operation of the system shown in Fig. 1; Figs. 5 and 7 are views similar to Fig. 1 and illustrating systems of other phase numbers; and Figs. 6 and 8 are vector diagrams explanatory of the systems of Figs. 5 and 7, respectively.

In a copending application of Chas. Le G. Fortescue, Serial No. 206,932, filed Dec. 13, 1917, and assigned to the Westinghouse Electric & Manufacturing Company there is described and claimed a system of phase conversion wherein a system of balanced electromotive forces is produced having the opposite phase sequence from the main polyphase electromotive forces generated in the converter windings without affecting the phase sequence of the drop electromotive forces. The resultant electromotive forces at the terminals of the phase-converter, being of the same phase number and direction of phase sequence as the drops, coalesce to provide substantially balanced resultant electromotive forces, as desired.

In the Fortescue application just mentioned, the effect of a phase-sequence reversal of the converter electromotive forces, for three-phase operation, is provided by the electromotive force of a single transformer supply winding, having its central point connected to the inner terminal of the tertiary winding of the converter and having its outer terminals connected to the inner terminals of the remaining converter windings, a non-interconnected converter winding being employed.

In the present system, for three-phase operation, I employ two secondary supply windings and an interconnected converter winding, said elements being so connected as to produce the effect of a phase-sequence reversal similar to that disclosed in the Fortescue application, together with lower voltages throughout the system and the possibility of an even simpler and more effective operation under no-load conditions. By opening up the transformer winding, rather than the converter winding, a more simple and desirable construction is provided.

Referring to Fig. 1, I show a phase-converter of the dynamo-electric type at 10, said converter comprising a Y-connected stator winding 0—1, 0—2 and 0—3 and a rotor member 11 provided with a short-circuited winding 12 and with a direct-current exciting winding 13. As it may be desirable to alter the excitation of the winding 13, circuit is completed thereto from a supply 14 through an adjustable rheostat 15.

The converter 10 is shown as applied in locomotive propulsion and, accordingly, derives single-phase energy from the transformer 16 and supplies polyphase energy to a propulsion motor 17. The transformer 16 comprises a primary winding 18, connected between the trolley at 19 and ground at 20, and two secondary windings 21 and 22.

The propulsion motor 17 comprises a stator winding 9—6, 9—7 and 9—8 and a rotor member 23 provided with a delta-connected winding 24, the terminals of which are interconnected through a rheostat 25. While, in usual practice, the rheostat would be mounted exterior to the rotor 23 and connected thereto through slip rings, I have, for simplicity and clearness, shown said rheostat within the rotor 23. The motor 17 is mechanically coupled to a drive wheel 26, supplying energy thereto during motoring and deriving energy therefrom during recuperation.

The phase-winding 0—1 of the converter 10 is connected to the terminal 6 of the motor 17 through the winding 21 and a switch 27. In like manner, the phase winding 0—2 of the converter 10 may be connected to the terminal 8 of the motor 17 through the transformer secondary winding 22 and a switch 28. The phase winding 0—3 of the converter may be connected to the terminal 7 of the motor 17 through a switch 29. The switches 27, 28 and 29 may be simultaneously operated, as by a rod 30, and, when thrown to the open position, said rod may close a switch 31, interconnecting the mid points of the windings 21 and 22.

While, for simplicity and clearness, I have shown the switches 27, 28, 29 and 31 as of the knife-blade type, it will be understood by those versed in the art that, in actual practice, power-operated switches would be employed in these relations, said switches being subject to a master-controller and being suitably mechanically or electrically interlocked to perform the function of the rod 30.

Having thus described the arrangement of a system embodying my invention, the operation thereof is as follows:

Upon placing the converter 10 in operation by any suitable means such, for example, as an auxiliary starting motor, said converter operates to derive single-phase energy from the transformer 16 and to supply polyphase energy to the motor 17. The electromotive forces generated in the phase windings 0—1, 0—2 and 0—3 may be indicated by vectors $0'-1'$, $0'-2'$ and $0'-3'$ in Fig. 2, said vectors being substantially balanced and having a positive vector rotation.

Upon deriving load current from the converter 10, the voltage drops therein produce drop vectors $0'-1''$, $0'-2''$ and $0'-3''$, said drop vectors having the opposite direction of phase sequence because of the fact that, in the generating phase or phases of the converter, the current is flowing in the direction of the generated electromotive force, whereas, in the motoring phase or phases of the converter, the current is flowing in opposition to the generated electromotive force. The combination of the vectors $0'-1'$, $0'-2'$ and $0'-3'$ with the drop vectors $0'-1''$, $0'-2''$ and $0'-3''$ produces unbalanced polyphase voltages at the terminals of the converter 10, in accordance with the well known proposition that an unbalanced polyphase system may be resolved into two balanced systems of positive and negative phase rotation, as fully explained in the appendix of an article entitled "Single-phase power service from central stations" by Gilman and Fortescue, appearing in the Proceedings of the American Institute of Electrical Engineers for October, 1916. The voltage appearing at the terminal 1 of the converter is not applied directly to the terminal 6 of the motor 17, however, but connection is made through the secondary winding 21, said secondary winding having a greater number of turns than the phase winding 0—1 in the ratio of $\sqrt{3}$ to 1, and, therefore, producing a 120° shift in the phase of the electromotive force supplied to the terminal 6, as will be noted by reference to the vector diagram of Fig. 3. The vector $0'-1'$ is plotted as before and the electromotive force of the winding 21 is indicated by a vector $1'-6'$, the resultant vector $0'-6'$ representing the electromotive force between the terminals 0 and 6' and occupying the same position as the vector $0'-2'$ in Fig. 2, representing the electromotive force of the winding 0—2.

In like manner, the vector $0'-2'$ in Fig. 3 is combined with the vector $2'-8'$ to produce the vector $0'-8'$, representing the electromotive force between the points 0 and 8 in Fig. 1, both in phase and in magnitude, and occupying substantially the same position as the vector $0'-1'$ in Fig. 2.

While certain of the last-named vectors are coincident in position, such, for example, as the vectors $0'-8'$ and $0'-1'$, I have shown them slightly separated for clearness.

Under load conditions, the effect of the drops $0'-1''$, $0'-2''$ and $0'-3''$ is to slightly alter the phase of the electromotive forces produced by the converter, as indicated in Fig. 4, without, however, unbalancing said electromotive forces. Referring to said figure, it will be noted that the vectors $0'-1'$, $0'-2'$ and $0'-3'$, representing, respectively, the induced electromotive forces of the phase windings 0—1, 0—2 and 0—3, have been vectorially combined with the vectors $0'-1''$, $0'-2''$ and $0'-3''$, representing, respectively, the drops in the corresponding phase windings, thus producing the vectors $0-1'''$, $0-2'''$ and $0-3'''$, corresponding, respectively, to the terminal voltages of the corresponding converter phase windings. The connection of the phase winding 0—1 through the secondary winding 21 permits the consolidation of the electromotive forces of said windings and, accordingly, the vector $1'''-6'$ in quadrature to the vector $0'-3'$ is constructed, thus determining the vector $0'-6'$, representing, in magnitude and phase, the electromotive force applied to the terminal 6 of the motor 17.

In like manner, the vector $0'-2'''$, representing the resultant voltage at the terminal 2 in the converter 10, is combined with the vector $2'''-8'$ to determine the vector $0'-8'$ representing the resultant voltage applied to the terminal 8 of the motor 17.

It will now be noted that the vectors $0-3'''$, $0-8'$ and $0-6'$ are substantially balanced and remain so throughout the complete cycle.

From a consideration of the no-load diagram of Fig. 3, it will be noted that the mid points of the vectors $2'-8'$ and $1'-6'$ are substantially coincident, that is to say, the mid points of the secondary windings 21 and 22 in Fig. 1 are, at all times, of the same voltage and phase, under no-load conditions. It will further be noted, from a consideration of the load diagram of Fig. 4, that, with an increasing load, the vectors 1'''—6' and 2'''—8' depart farther and farther from each other, although maintaining their condition of parallelism. Accordingly, an increase in voltage is developed between the mid points thereof.

When the motor 17 is disconnected from the converter 10, as by the opening of the switches 27, 28 and 29, there is no current path through the converter for maintaining it in operation. Under these no-load conditions, however, the mid points of the windings 21 and 22 are at equal potential and may, therefore, be interconnected, as through a switch 31, thus producing a closed path adequate for keeping the converter in operation.

Under load conditions, this interconnection should be broken because of the required difference in potential between said secondary winding mid points for balance of the phases of the motor 17, as pointed out in connection with Fig. 4, and this function is effectually performed by the interlocking of the switches 27, 28 and 29, on the one hand, and of the switch 31 on the other, said interlocking being indicated by the rod 30.

I have described my invention, up to this point, in connection with three-phase systems, but it is equally applicable in connection with polyphase systems of any phase number. Thus, in Fig. 5, I have shown an interconnected quarter-phase phase-converter at 30, said phase-converter comprising a primary winding 31, a secondary winding 32 and a tertiary winding 33. A suitable quarter-phase load, such, for example, as a motor 34, is provided and comprises phase windings 35, 36, 37 and 38. The upper terminal of the winding 31 is connected, through the transformer-supply winding 21 to the terminal of the motor winding 36 and, in like manner, the lower terminal of the converter-winding 31 is connected, through the transformer winding 22, to the terminal of the motor winding 38. The operation of the system thus indicated will be obvious from the foregoing description but, for a detailed description thereof, attention is directed to Fig. 6.

The electromotive forces of the converter primary winding may be indicated by vectors 31' and 31''. In like manner, the electromotive forces of the converter tertiary 33 may be indicated by vectors 33' and 33''. The electromotive forces of the transformer windings 21 and 22 are indicated by the vectors 21' and 22', respectively. The connection of the transformer windings 21 and 22 between the converter and the motor permits the compounding of the electromotive forces of the winding 31 with those of the transformer windings and thus the electromotive force applied to the motor winding 36 is the vector sum of the electromotive forces 31' and 21' in Fig. 6, being substantially that represented by the vector 31''. Similarly, the vector 31'' is compound with the vector 22' to determine the electromotive force supplied to the motor winding 38, said resultant electromotive force being substantially that represented by the vector 31'.

Thus, it will be noted that the effect of the vectors 21' and 22' is to swing the vectors 31' and 31'' through 180° or, in other words, producing the effect of reversing the direction of phase sequence of the electromotive forces generated in the converter 30 before permitting the supply of said electromotive forces to the motor 34. By said phase sequence reversal, the phase sequence of the output electromotive forces of the converter 30 is caused to coincide in direction with the phase rotation of the drop electromotive forces therein, thus balancing the electromotive forces supplied to the motor.

Figs. 7 and 8 similarly apply to a six-phase system. A six-phase interconnected converter 40 comprises stator phase windings 41 to 46, inclusive, the windings 41 and 44 together constituting the tertiary winding. Energy from the converter 40 is supplied to a load circuit, such as a six-phase motor 50, comprising phase windings 51 to 56, inclusive. The supply-transformer 16 is provided with four secondary windings 57 to 60, inclusive.

The tertiary windings 41 and 44 are connected respectively to the motor windings 51 and 54. The converter winding 42 is connected through the supply winding 58 to the motor winding 52 and, similarly, the converter winding 43 is connected to the motor winding 53 through the supply winding 57; the converter winding 45 is connected to the motor winding 55 through the supply winding 60, and the converter winding 46 is connected to the motor winding 56 through the supply winding 59.

Vectorially, the action of the system thus disclosed is substantially a duplication of that indicated in Fig. 3. The electromotive forces generated in the converter windings 41 to 46, inclusive, may be indicated by suitably spaced vectors 41' to 46', inclusive, in Fig. 8, said vectors being indicated as arranged in clockwise order. The connection of the converter winding 42 through the supply winding 58 permits the compounding of the vector 42' with a vector 58', indicating the electromotive force of the winding 58, resulting in the application of an electromotive force to the motor winding 52 having the phase indicated by the vector 46'. Similarly, the electromotive force of the winding 43 is compounded with that of the winding 57, that of the winding 45 with that of the winding 60 and that of the winding 60 with that of the winding 59. In effect, it will be noted that the vectors 42' and 46' have been interchanged in position and, similarly, the vectors 43' and 45'. Thus, the direction of phase sequence rotation of the output electromotive forces of the converter 40 has, in effect, been reversed without reversing the direction of the phase sequence of the drops therein.

Reference to the three, four and six-phase systems shown in Figs. 1, 5 and 7, respectively, will show that, in each instance, the single-phase windings are connected to the polyphase terminals at points such that the single-phase voltages are at right angles to a line of reference passing through one of the star phases of the converter, whereby the vectors of the converter combine, in pairs, with the single-phase vectors to produce resultants similarly located on opposite sides of the line of reference. In other words, the connections are symmetrically arranged with respect to a diameter of a circle circumscribed about the polyphase vectors, which we may call a diameter of the polyphase system, whereby the converter phases on each side of said diameter are, in effect, moved over to corresponding positions on the other side of said diameter, as shown by the vector diagrams in Figs. 3, 6 and 8.

My invention is described in connection with star-connected apparatus but it is equally applicable to delta-connected apparatus appropriate connection being made to the proper terminals.

While I have described my invention in a plurality of forms, it will be obvious to those skilled in the art that it is susceptible of various minor changes and modifications without departing from the spirit thereof and I desire, therefore, that only such limitations shall be placed thereupon as are imposed by the prior art or specifically set forth in the appended claims.

I claim as my invention:

1. In a converting system, the combination with a phase-converter having "n" primary windings and a tertiary winding, of a single-phase source subdivided into "n" portions, a polyphase load circuit, connections from each primary winding through one of said portions of the source, respectively, to a phase division of said load circuit, and connections from the tertiary winding of said converter to other phase-divisions of said load circuit, said connections being such that the electromotive forces of said source subdivisions combine with the electromotive forces supplied from said converter to supply a resultant system of electromotive forces to said load circuit having the reverse phase-sequence from the converter electromotive forces.

2. In a phase-converting system, the combination with two sources of substantially co-phasial, single-phase alternating-current, of a three-phase phase-converter, a three-phase circuit, connections from two terminals of said converter through said sources, respectively, to two terminals of said three-phase circuit, and a connection from the remaining terminal of said converter to the remaining terminal of said three-phase circuit, the connections and magnitude of said single-phase sources being such as to combine with the electromotive forces of said converter to produce a resultant balanced system of electromotive forces having the opposite phase-sequence from the converter electromotive forces.

3. In a phase-converting system, the combination with two sources of substantially co-phasial single-phase alternating-current of substantially equal voltage, of a three-phase phase-converter so designed that the star electromotive force thereof is less than the electromotive forces of said sources in the ratio of 1 to $\sqrt{3}$, a three-phase circuit, connections from two terminals of said converter through said sources, respectively, to two terminals of said three-phase circuit, and a connection from the remaining terminal of said converter to the remaining terminal of said three-phase circuit, the connections being such that the electromotive forces of said converter combine with the electromotive forces of said source to produce a resultant system of electromotive forces having the opposite phase-sequence from the converter electromotive forces.

4. In a phase-converting system, two sources of single-phase alternating current, a load circuit, a phase-converter having two of its terminals connected through said sources to said load circuit, respectively, said load circuit being arranged to complete an operating circuit through said source and said converter, and means for completing an auxiliary operating circuit when said load circuit is disconnected.

5. In a phase-converting system, two sources of single-phase alternating current, a load circuit, a phase-converter having two of its terminals connected through said sources, respectively, said load circuit being arranged to complete an operating circuit through said source and said converter, and means for completing a circuit between the mid-points of said single-phase sources, when said load circuit is disconnected, whereby said phase-converter is maintained in operation.

6. In a phase-converting system, the combination with a three-phase system, of a single-phase system including a single-phase transformer having two insulated windings adapted to be connected to said three-phase system, a dynamo-electric machine having a three-phase winding and a relatively rotating damper winding, means for connecting two of the terminals of said machine respectively to a terminal of one of said single-phase windings and to the terminal of the other single-phase winding having the opposite polarity, and means for connecting the three-phases of the three-phase system respectively to the remaining terminals of said machine and single-phase windings, said machine having a phase-sequence opposite to that of said three-phase system.

7. In a phase-converting system, the combination with a three-phase system, of a single-phase system including a single-phase transformer having two insulated windings adapted to be connected to said three-phase system, a dynamo-electric machine having a three-phase winding and a relatively rotating member carrying a damper winding and unidirectional exciting means, means for connecting two of the terminals of said machine respectively to a terminal of one of said single-phase windings and to the terminal of the other single-phase winding having the opposite polarity, and means for connecting the three phases of the three-phase system respectively to the remaining terminals of said machine and single-phase windings, said machine having a phase-sequence opposite to that of said three-phase system.

8. In a phase-converting system, the combination with a three-phase system, of a single-phase system including a single-phase transformer having two insulated windings adapted to be connected to said three-phase system, a dynamo-electric machine having a three-phase winding and a relatively rotating damper winding, means for connecting two of the terminals of said machine respectively to a terminal of one of said single-phase windings and to the terminal of the other single-phase winding having the opposite polarity, means for connecting the three phases of the three-phase system respectively to the remaining terminals of said machine and single-phase windings, said machine having a phase-sequence opposite to that of said three-phase system, and means whereby the machine may be maintained in rotation, at times, as a shunt-connected motor.

9. In a phase-converting system, the combination with a three-phase system, of a single-phase system including a single-phase transformer having two insulated windings adapted to be connected to said three-phase system, a dynamo-electric machine having a three-phase winding and a relatively rotating damper winding, means for connecting two of the terminals of said machine respectively to a terminal of one of said single-phase windings and to the terminal of the other single-phase winding having the opposite polarity, means for connecting the three phases of the three-phase system respectively to the remaining terminals of said machine and single-phase windings, said machine having a phase-sequence opposite to that of said three-phase system, and means for, at times, disconnecting said three-phase system from said machine and interconnecting said transformer windings, whereby said machine may be maintained in rotation as a single-phase motor.

10. In a phase-converting system, the combination with a three-phase system, of a single-phase system including a single-phase transformer having two insulated windings adapted to be connected to said three-phase system, both of said windings having substantially the same number of turns, a dynamo-electric machine having a three-phase winding and a relatively rotating damper winding, means for connecting two of the terminals of said machine respectively to a terminal of one of said single-phase windings and to the terminal of the other single-phase winding having the opposite polarity, and means for connecting the three phases of the three-phase system respectively to the remaining terminals of said machine and single-phase windings, said machine having a phase-sequence opposite to that of said three-phase system.

11. In combination, a single-phase translating device comprising a transformer having at least two windings, a polyphase translating device of the same frequency, a series balancer machine comprising a polyphase winding and a co-operating member relatively rotating at approximately synchronous speed in such direction as to generate, in said polyphase winding, electromotive forces of said frequency but having a phase-sequence opposite to that of said polyphase translating device, a damper winding on said cooperating member, connections serially including said series balancer for interconnecting said polyphase translating device and said transformer windings for interchange of power and means whereby an interconnection may be established between intermediate points of said transformer windings when said interchange of power is reduced to zero value.

12. In combination, a single-phase translating device having at least two portions, a polyphase translating device of the same frequency, a series balancer machine comprising a polyphase winding and a co-operating member relatively rotating at approximately syncronous speed in such direction as to generate, in said polyphase winding, electromotive forces of said frequency but having a phase-sequence opposite to that of said polyphase translating device, a damper winding on said cooperating member, connections serially including said series balancer for interconnecting said translating devices for interchange of power, and unidirectional exciting means of substantially the proper strength for driving through the magnetic circuits of said machine a field flux such as to generate a terminal electromotive force in said machine which is equal in magnitude to that of said polyphase translating device, said single-phase portions having such electromotive forces as to produce the effect of reversing the phase-sequence of the balancer electromotive forces.

13. In combination, a single-phase translating device having at least two portions, a polyphase translating device of the same frequency, a series balancer machine comprising a polyphase winding and a co-operating member relatively rotating at approximately synchronous speed in such direction as to generate, in said polyphase winding, electromotive forces of said frequency but having a phase-sequence opposite to that of said polyphase translating device, a damper winding on said cooperating member, connections serially including said series balancer for interconnecting said translating devices for interchange of power, and means whereby the machine may be maintained in rotation, at times, as a shunt-connected motor.

14. In combination, a single-phase translating device having at least two portions, a polyphase translating device of the same frequency, a series-balancer machine comprising a polyphase winding and a co-operating member relatively rotating at approximately synchronous speed in such direction as to generate, in said polyphase winding, electromotive forces of said frequency but having a phase-sequence opposite to that of said polyphase translating device, a damper winding on said cooperating member, connections serially including said series balancer for interconnecting said translating devices for interchange of power, and means whereby an interconnection may be established between said single-phase portions whereby said balancer may be maintained in rotation as a single-phase motor when said polyphase translating device is inoperative.

15. In a converting system, the combination with a phase converter, of a multiple-winding, single-phase transformer, a polyphase circuit, and connections for symmetrically inserting said transformer between said converter and said polyphase circuit.

16. The combination with a polyphase system, of a polyphase dynamo-electric machine having a relatively rotating damper winding, a single-phase transformer having an even number of insulated windings, means for connecting one terminal of each of said transformer windings to a different phase of said polyphase system, said connections being symmetrical with respect to a diameter of said polyphase system, means for directly interconnecting the corresponding phases of the polyphase system and the machine in said diameter, and means for connecting the remaining phases of the machine to the corresponding remaining phases of said transformer windings.

17. In a balancing system, the combination with a phase-balancer, of a supply circuit therefor, a load circuit, only one of said circuits being a balanced polyphase circuit, and symmetrical connections for inserting the unbalanced circuit between said converter and the balanced circuit.

In testimony whereof, I have hereunto subscribed my name this 28th day of Nov. 1917.

LEWIS WARRINGTON CHUBB.